United States Patent [19]
Wamprecht et al.

[11] Patent Number: 5,384,358
[45] Date of Patent: Jan. 24, 1995

[54] PROCESS FOR THE PRODUCTION OF HYDROXY-FUNCTIONAL COPOLYMERS

[75] Inventors: Christian Wamprecht, Neuss; Hans-Ulrich Meier-Westhues, Leverkusen; Jürgen Meixner; Günter Ruf, both of Krefeld, all of Germany

[73] Assignee: Bayer Aktiengesellschaft, Leverkusen, Germany

[21] Appl. No.: 32,921

[22] Filed: Mar. 18, 1993

[30] Foreign Application Priority Data

Mar. 20, 1992 [DE] Germany .............................. 4209035

[51] Int. Cl.$^6$ ........................ C08G 63/48; C08G 63/91
[52] U.S. Cl. ........................................ 525/28; 525/34; 525/35; 525/48; 525/49
[58] Field of Search ................... 525/34, 35, 221, 222, 525/223, 227, 241, 28, 48, 49

[56] References Cited

U.S. PATENT DOCUMENTS

| | | | |
|---|---|---|---|
| 3,753,958 | 8/1973 | Wingler et al. | 260/78.5 R |
| 3,956,245 | 5/1976 | Van Steenis et al. | 260/878 R |
| 4,414,370 | 11/1983 | Hamielec et al. | 526/88 |
| 4,529,787 | 7/1985 | Schmidt et al. | 526/317 |
| 4,546,160 | 10/1985 | Brand et al. | 525/320 |
| 4,710,556 | 12/1987 | Plum | 526/273 |
| 5,015,688 | 5/1991 | Bederke et al. | 524/600 |
| 5,082,922 | 1/1992 | Brandenburger et al. | 528/323 |

FOREIGN PATENT DOCUMENTS

| | | |
|---|---|---|
| 206072 | 12/1986 | European Pat. Off. . |
| 1771374 | 7/1972 | Germany . |
| 8202387 | 7/1982 | WIPO . |

*Primary Examiner*—James J. Seidleck
*Assistant Examiner*—Mary Critharis
*Attorney, Agent, or Firm*—Joseph C. Gil; Lyndanne M. Whalen

[57] ABSTRACT

A process for the solvent-free production of hydroxy-functional copolymers by copolymerization of unsaturated monomers in a mixture of a polyester component and an unsaturated ester component as reaction medium, the use of the hydroxy-functional copolymers so obtained as binder component in polyurethane powder coatings, a powder coating based on these copolymers and its use for coating any heat resistant substrates.

9 Claims, No Drawings

PROCESS FOR THE PRODUCTION OF HYDROXY-FUNCTIONAL COPOLYMERS

BACKGROUND OF THE INVENTION

The invention relates to a new process for the solvent-free production of hydroxy-functional copolymers, their use as a binder component in polyurethane powder coatings, the powder coatings produced using these copolymers and the use of these powder coatings to coat heat-resistant substrates.

Hydroxy-functional copolymers (polyacrylates) have in recent years won a secure position in the coatings sector. For ecological reasons, the reduction of the organic solvents necessarily used in the production and processing of hydroxy-functional polyacrylates is becoming increasingly important.

Hydroxy-functional copolymers are usually produced in inert organic solvents. In the course of the so-called continuous addition process, the bulk of the solvent is charged into a polymerization reactor and heated to the desired polymerization temperature. Subsequently, the monomer mixture and the initiator are charged simultaneously into the reactor at constant temperature and the desired copolymer is formed in the charged solvent by radical-initiated copolymerization. After charging of the monomer mixture and of the initiator is complete, stirring is continued for a certain additional period in order to complete the monomer conversion. The polymer solutions obtained usually have a narrow molecular weight distribution and can be used immediately after their production for the application concerned.

If, however, it is desired to recover and process solvent-free polymers, it is necessary to remove the solvent. The solvent is usually removed by distillation or in evaporation units. This procedure requires a considerable expenditure on equipment. Also, the recovered solvent cannot be used for further polymerization reactions without reprocessing, because it is usually contaminated with residual monomers.

One process for the production of solvent-free, hydroxy-functional polyacrylates is bulk polymerization in continuous reactors. In this process, the high equipment cost is disadvantageous, because the monomers which were not converted in the polymerization process must be distilled off, quantitatively determined and recharged to the polymerization process in the correct proportion. Continuous bulk polymerization processes are described, for example, in EP-A-00 68 024, EP-A-00 96 901, EP-A-01 56 170, U.S. Pat. No. 4,414,370, U.S. Pat. No. 4,529,787 and U.S. Pat. No. 4,546,160.

Such bulk polymerizations can, however, also be carried out discontinuously with evaporative cooling. Such processes are described, for example, in DE-OS 1 965 740, DE-AS 1 771 374 and DE-AS 2 422 043. The disadvantages of these processes are the restriction of the polymerization temperature and the fluctuation of the polymerization temperature during the polymerization. The highly exothermic reaction presents considerable cooling problems because the dissipation of the heat of reaction is made difficult by the large increase of viscosity.

A further possibility for the production of solvent-free, hydroxy-functional polyacrylates is the use of "reactive solvents", which first serve as reaction medium for the radical polymerization of the monomers and subsequently are added by a polymer-like reaction to the polyacrylate formed (PCT Application, Publication Number: WO 90/03991). In this case, $\epsilon$-caprolactone serves as the "reactive solvent". After the radical polymerization, the $\epsilon$-caprolactone is added by catalytic ring-opening polymerization to the OH groups of the polyacrylate with formation of new hydroxyl groups. The disadvantages of this process are (1) two consecutive reaction stages are necessary in order to obtain the desired solvent-free final product, and (2) for the second reaction stage, zinc catalysts are necessary. These catalysts are still present in the final product and during combination with, e.g., polyisocyanates, catalyze the urethane reaction and significantly reduce the pot life of the lacquer preparations concerned. As a result of this polymer-like reaction, the molecular weight and the viscosity of the polymers increase and disadvantageously affect the stirrability of the product in the reaction vessel.

Another kind of polymerization reaction in "reactive solvents" is described in EP-A-00 56 971. The reaction medium is a dialkyl maleate, which does not usually tend to homopolymerize. In this process, the low-viscosity dialkyl maleate is gradually incorporated into the polymer chain by reaction with the other monomers charged, so that at the end of the polymerization a nearly 100% product is present. Despite the good stirrability at the start of the polymerization, the formation of the high-molecular weight, almost 100% polymer leads to stirring problems towards the end of the reaction due to high melt viscosities.

The use of saturated or unsaturated polyesters as a reaction medium or grafting backbone provides another option for the production of solvent-free copolymers. Such processes are described, for example, in the patent applications EP-A-02 06 072 and EP-A-03 91 271. In this process, the high viscosity of the "reaction medium polyester" at the start of the process leads to poor dissipation of the heat of reaction and results in products with a very non-uniform molecular-weight distribution.

SUMMARY OF THE INVENTION

It is an object of the present invention to provide a new process for the solvent-free production of hydroxy-functional copolymers that does not have the viscosity problems encountered in known processes.

It is also an object of the present invention to provide a process for the solvent-free production of hydroxy functional copolymers in which no catalyst need be employed.

It is another object of the present invention to provide hydroxy-functional copolymers which are useful in the production of powder coatings.

It is a further object of the present invention to provide powder coatings for heat resistant substrates such as motor vehicle components.

These and other objects which will be apparent to those skilled in the art are accomplished by heating a mixture of A) from about 5 to about 30 parts by weight of at least one polyester polyol with a hydroxyl number of from about 40 to about 180 at an acid value of less than 12 and a glass transition temperature of from about $-40°$ to about $80°$ C. and B) from about 1 to about 10 parts by weight of an olefinically unsaturated maleic acid di(cyclo)alkyl ester having from 1 to 12 carbon atoms in the (cyclo)alkyl group to a polymerization temperature of from about $130°$ to about $200°$ C. To this mixture is then added C) a monomer mixture composed of (1) from 0 to about 70 parts by weight of methyl methacrylate, (2) from 0 to about 60 parts by weight of at least one (cyclo)alkyl ester of acrylic and/or methacrylic acid having from 2 to 18 carbon atoms in the (cyclo)alkyl group, (3) from about 10 to about 60 parts by weight of at least one aromatic vinyl compound, (4) from about 6 to about 40 parts by weight of (i) a hydroxyalkyl ester of acrylic and/or methacrylic acid having from 2 to 6 carbon atoms in the hydroxyalkyl group and/or (ii) a reaction product of one hydroxyalkyl ester of acrylic and/or methacrylic acid having from 2 to 6 carbon atoms in the hydroxyl group with ε-caprolactone having a molecular weight of no greater than 500 and (5) from 0 to about 5 parts by weight of an olefinically unsaturated carboxylic acid with the sum of (1), (2), (3), (4) and (5) totaling 100 parts by weight and D) from about 0.5 to about 8 parts by weight of an initiator for radical polymerization. Components A) and B) are at a temperature of from about 130° to about 200° C. when components C) and D) are added. The sum of A), B) C and D) is 100. The resultant hydroxy-functional copolymer is then combined with a polyisocyanate to form a powder coating useful for coating heat resistant substrates such as motor vehicle components.

DETAILED DESCRIPTION OF THE INVENTION

The present invention is a process for the solvent-free production of hydroxy-functional copolymers by radical-initiated copolymerization of unsaturated monomers in which A) from about 5 to about 30 parts by weight of a polyester component made up of at least one polyester polyol with a hydroxyl number of 40 to 180 at an acid value of 12 and a glass transition temperature of −40° to +80° C. and B) from about 1 to about 10 parts by weight of an olefinically unsaturated ester component, composed of at least one maleic acid di(cyclo)alkyl ester with 1 to 12 carbon atoms in the (cyclo)alkyl group are charged into a polymerization reactor as reaction medium and heated to a polymerization temperature of 130° to 200° C.

Subsequently,

C) from about 42 to about 93.5 parts by weight of a monomer mixture composed of 1) from 0 to about 70 parts by weight of methyl methacrylate, 2) from 0 to about 60 parts by weight of (cyclo)alkyl esters of acrylic and/or methacrylic acid with 2 to 18 carbon atoms in the (cyclo)alkyl group, 3) from about 10 to about 60 parts by weight of vinyl aromatics, 4) from about 6 to about 40 parts by weight of hydroxyalkyl esters of acrylic and/or methacrylic acid with 2 to 6 carbon atoms in the hydroxyalkyl group and/or their reaction products of maximum molecular weight 500 with ε-caprolactone and 5) from 0 to about 5 parts by weight of olefinically unsaturated carboxylic acids, which the sum of the parts by weight of components 1) to 5) is 100, and D) from about 0.5 to about 8 parts by weight of an initiator component for the radical polymerization are charged into the reactor at 130° to 200°C. The sum of the parts by weight of components A) to D) is 100.

This invention also relates to the use of the hydroxy-functional copolymers obtainable by this process as a binder component in polyurethane powder coatings.

The present invention further relates to a powder coating composed of i) a polyol component ii) a hardener which is at least one blocked and/or unblocked polyisocyanate and optionally iii) auxiliary substances and additives, in which component i) is composed of at least one hydroxy-functional copolymer obtained by the process according to the invention.

The invention further relates to the use of the powder coating for coating any heat-resistant substrates, in particular for coating motor vehicle components.

The hydroxy-functional copolymers obtainable by the process of the present invention have a hydroxyl number of from about 30 to about 200, preferably from about 40 to about 150 mg KOH/g and a molecular weight determinable by gel permeation chromatography (GPC) (weight-average, polystyrene standard) of from about 1,500 to about 75,000, preferably from about 2,000 to about 50,000, as well as a glass transition temperature Tg determinable by differential thermal analysis (DTA) of from about 20° to about 100° C., preferably from about 25° to about 75° C.

In the process of the present invention, preferably from about 5 to about 25 parts by weight of component A), from about 1 to about 5 parts by weight of component B), from about 64 to about 93 parts by weight of component C) and from about 1 to about 6 parts by weight of component D) are used.

Polyester component A) is at least one hydroxy-functional polyester with a hydroxyl number of from about 40 to about 180 at an acid number of less than 12 and a glass transition temperature of from about −40° to about +80° C. The molecular weight of the polyester polyols which may be calculated from the stoichiometry of the starting materials used is preferably from about 500 to about 4,000. In the production of the hydroxy-functional polyesters, a total of 4 groups of monomer components are used:

a) (cyclo)alkanediols (i.e. dihydric alcohols with (cyclo)aliphatically-bonded hydroxyl groups) in the molecular weight range of from about 62 to about 286 such as ethylene glycol, 1,2- and 1,3-propanediol, 1,2-, 1,3- and 1,4-butanediol, 1,5-pentanediol, 1,6-hexanediol, neopentyl glycol, cyclohexane-1,4-dimethanol, 1,2- and 1,4-cyclohexanediol, 2,2-bis(4-hydroxycyclohexyl)propane or reaction products of these diols with ε-caprolactone, ethylene oxide and/or propylene oxide with a maximum molecular weight of 520, b) tri- and higher-hydric alcohols in the molecular weight range of from about 92 to about 254 such as trimethylolpropane, glycerol, pentaerythritol and dipentaerythritol, c) dicarboxylic acids in the molecular weight range of from about 116 to about 600 and/or their anhydrides such as phthalic acid, phthalic anhydride, isophthalic acid, tetrahydrophthalic acid, tetrahydrophthalic anhydride, hexahydrophthalic acid, hexahydrophthalic anhydride, terephthalic acid, fumaric acid, maleic acid, maleic anhydride, succinic acid, succinic anhydride, adipic acid, hydrogenated dimeric fatty acids and optionally, d) monocarboxylic acids such as benzoic acid, 2-ethylhexanoic acid, caproic acid, octanoic acid, capric acid or lauric acid.

In the production of the polyester polyols A), any mixture of the monomeric constituents a) to c) and optionally d) can be used, with the proviso that the selection is made so that the resulting polyester has an OH number in the range of from about 40 to about 180 at an acid number of less than 12 and a glass transition temperature of from about −40° to about +80° C. This condition is satisfied if during the production of the polyesters a suitable ratio of "softening" monomeric constituents (which lead to the lowering of the glass transition temperature of the polyesters) to "hardening" monomers (which lead to the raising of the glass transition temperature) is used.

"Softening" monomeric constituents include: aliphatic diols such as 1,4-butanediol, 1,5-pentanediol and 1,6-hexanediol and aliphatic dicarboxylic acids such as succinic acid and adipic acid.

"Hardening" monomeric constituents include: cyclic aromatic dicarboxylic acids such as phthalic acid, isophthalic acid and terephthalic acid and diols such as 1,4-cyclohexanediol, 1,4-cyclohexanedimethanol and neopentyl glycol.

Polyester A) is produced in known manner by, for example, the methods which are described in detail in "Ullmann's Encyclopedia of Industrial Chemistry" Verlag Chemie Weinheim, 4th ed. (1980), vol. 19, pages 61 ff. and H. Wagner and H. F. Sarxin "Lackkunstharze", Carl Hanser Verlag, Munchen (1971), pages 86–152. The esterification is optionally carried out in the presence of a catalytic amount of any of the conventional esterification catalysts such as acids, bases and transition metal compounds (e.g., titanium tetrabutylate) at from about 80° to about 260° C., preferably from about 100° to about 240° C.

The esterification reaction is carried out until the desired values of the hydroxyl and acid number have been reached. The molecular weight of the polyester polyols can be calculated from the stoichiometry of the starting materials (in view of the resulting hydroxyl and acid numbers).

Component B) is composed of at least one maleic acid di(cyclo)alkyl ester having from 1 to 12, preferably from 1 to 8, carbon atoms in the (cyclo)alkyl group. Examples of such esters include: dimethyl maleate, diethyl maleate, di-n-butyl maleate, di-2-ethylhexyl maleate, di-n-decyl maleate, di-n-dodecyl maleate and di-cyclohexyl maleate.

The monomer mixture C) is preferably composed of from about 10 to about 60 parts by weight of monomer (1), from 0 to about 50 parts by weight of monomer (2), from about 10 to about 50 parts by weight of monomer (3), from about 10 to about 35 parts by weight of monomer (4) and from 0 to about 4 parts by weight of monomer (5) with the sum of the parts by weight of components (1) to (5) being 100.

In this monomer mixture, monomer (1) is methyl methacrylate.

Monomer (2) includes one or more (cyclo)alkyl esters of acrylic or methacrylic acid with from 2 to 18, preferably from 2 to 12, carbon atoms in the (cyclo)alkyl group. Examples of suitable monomers b) are ethyl (meth)acrylate, n-propyl (meth)acrylate, n-butyl (meth)acrylate, tert-butyl (meth)acrylate, 2-ethylhexyl (meth)acrylate, cyclohexyl methacrylate, neopentyl methacrylate, isobornyl methacrylate, 3,3,5-trimethylcyclohexyl (meth)acrylate and stearyl (meth)acrylate.

Monomer (3) may be styrene, vinyltoluene (technical isomer mixture of m- and p-methylstyrene 60:40) or α-methylstyrene. Styrene is preferred.

Suitable monomers (4) include hydroxyalkyl esters of the acids mentioned above as being suitable for the production of monomer (2) with from 2 to 6, preferably from 2 to 4, carbon atoms in the hydroxyalkyl group such as 2-hydroxyethyl (meth)acrylate, hydroxypropyl (meth)acrylate (isomer mixture formed by the addition of propylene oxide to (meth)acrylic acid), 4-hydroxybutyl acrylate and addition products with a maximum molecular weight of 500 of ε-caprolactone to such simple hydroxyalkyl esters. The term "hydroxyalkyl esters" as used herein is intended to include radicals having ester groups that are formed by addition of ε-caprolactone to simple hydroxyalkyl esters. Reaction products of glycidyl (meth)acrylate with saturated monocarboxylic acids, as well as reaction products of (meth)acrylic acid with saturated monoepoxides, that may have OH groups are also considered to be "hydroxyalkyl esters of (meth)acrylic acid" suitable as monomer d).

Suitable monomers (5) include olefinically unsaturated carboxylic acids such as acrylic acid and methacrylic acid.

It is particularly preferred that the monomer mixture C) be composed of
(1) from about 15 to about 55 parts by weight of methyl methacrylate,
(2) from 0 to about 40 parts by weight of alkyl esters of acrylic and/or methacrylic acid with from 2 to 18 carbon atoms in the alkyl group,
(3) from about 10 to about 45 parts by weight of styrene,
(4) from about 10 to about 30 parts by weight of 2-hydroxyethyl methacrylate and/or hydroxypropyl methacrylate (addition product of propylene oxide to methacrylic acid composed of 2-hydroxypropyl methacrylate and 2-hydroxy-1-methylethyl methacrylate in the ratio of about 3:1) and
(5) from 0 to about 3 parts by weight of acrylic acid and/or methacrylic acid,
with the sum of the parts by weight of components (1) to (5) being 100.

Any mixtures of the monomers (1) to (5) within the above-mentioned proportion limits can be used in the process of the present invention as component C), with the proviso that the amount of each component is selected so that the resulting polyol binder will have a hydroxyl number and glass transition temperature within the above-mentioned ranges. This essential condition is met if in the production of the copolymers a suitable ratio of "softening" monomers (which lower the glass transition temperature of the copolymers) to "hardening" monomers (which lead to the raising of the glass transition temperature) is used. A suitable ratio could readily be determined by one of ordinary skill in the art.

"Softening" monomers include alkyl esters of acrylic acid, as e.g. ethyl acrylate, n-butyl acrylate, isobutyl acrylate and 2-ethylhexyl acrylate. "Hardening" monomers include alkyl esters of methacrylic acid such as methyl methacrylate, ethyl methacrylate, isobutyl methacrylate, cyclohexyl methacrylate, isopropyl methacrylate, tert-butyl methacrylate, neopentyl methacrylate, isobornyl methacrylate and 3,3,5-trimethylcyclohexyl methacrylate and vinyl aromatics such as styrene, vinyl-toluene and α-methylstyrene.

Suitable initiators D) include conventional radical starters, such as aliphatic azo compounds (e.g., azodiisobutyronitrile, azobis(2-methylvaleronitrile), 1,1'-azobis(1-cyclohexanenitrile) and 2,2'-azobis(isobutyric acid alkyl esters)), symmetrical diacyl peroxides (e.g., acetyl, propionyl and butyryl peroxide, benzoyl peroxides substituted with bromo, nitro, methyl or methoxy groups, lauryl peroxides), symmetrical peroxydicarbonates (e.g. diethyl, diisopropyl, dicyclohexyl and dibenzoyl peroxydicarbonate, tert-butylperoxy 2-ethylhexanoate, tertbutyl perbenzoate), hydroperoxides (e.g., tert-butyl hydroperoxide, cumene hydroperoxide) and dialkyl peroxides (e.g., dicumyl peroxide, tert-butyl cumyl peroxide and di-tert-butyl peroxide). Di-tert-butyl peroxide is preferred.

For regulation of the molecular weight of the polyol binders of the present invention, conventional regulators can be used during their production. When such regulators are used, they are added to the monomer mixture C). Tert-dodecyl-mercaptan, n-dodecyl mercaptan and mercaptoethanol are examples of suitable regulators. The regulators can usually be added in an amount of from about 0.1 to about 5 wt % relative to the total amount of the monomer mixture C).

The polymerization temperature for the process of the present invention is 130° to 200° C., preferably 140° to 180° C.

In carrying out the process of the present invention, the polyester component A) and at least one maleic acid ester B) are charged into a polymerization reactor and heated to the desired polymerization temperature. Under these conditions, the mixture of A) and B) charged constitutes a reaction medium whose viscosity is low enough to dissipate well the heat of reaction of the radical copolymerization to be carried out and to ensure a constant polymerization temperature. In particular, the content of maleic acid esters, which are generally low-viscosity liquids, contributes to the desired low viscosity of the reaction medium.

When the desired polymerization temperature is reached, the monomer mixture C) and the initiator D) are charged, preferably starting simultaneously, into the reaction medium of A) and B). The charged constituents of the monomer mixture C) are then copolymerized in the reaction medium by radical initiated copolymerization. The dialkyl maleate esters charged, which as a rule do not tend to homopolymerize, also are gradually incorporated into the polymer chain being formed. In the process of the present invention, the polyester component A) preferably has no unsaturated double bonds. In order to obtain specific product properties, however, it may be advantageous to use polyesters that have a small content of polymerizable double bonds and can, therefore, undergo copolymerization reactions.

After the charging of the monomer mixture C) and of the initiator D), stirring is continued for a certain time at the desired polymerization temperature in order to complete the polymerization reaction. When the polymerization is completed, volatile constituents (e.g., residual monomers and cleavage products that may still be present from the initiator) are removed by application of a vacuum and distillation. Subsequently, the final product, which is still kept at polymerization temperature and is now a homogeneous mixture, is discharged from the polymerization reactor, possibly by application of a small over-pressure, and distributed (e.g., to aluminum dishes). After cooling (e.g., to room temperature), the desired polyol binder is obtained as a solid resin which can then be used to produce powder coatings and powder coated heat resistant articles.

In general, the polymerization process of the present invention is carried out in a closed pressure reactor in which the pressure rises continuously during the charging phase and can reach values of up to 20 bar. If high-boiling monomeric constituents which cause no reflux below the selected polymerization temperature are used, the polymerization can also be carried out under atmospheric pressure.

The polyhydroxy compounds obtained by the process according to the present invention are valuable binder components for polyurethane powder coatings, and optionally in combination with polyesters and/or polyacrylates having further hydroxyl groups, form the essential polyol component of the powder coatings of the present invention.

The powder coatings of the present invention may be produced by reacting the polyhydroxy copolymers of the present invention with suitable materials such as polyisocyanates with free and/or blocked, isocyanate groups. In particular, polyisocyanates which are solid at room temperature and have isocyanate groups bonded to tert-aliphatic carbon atoms can be used in unblocked form.

Blocked polyisocyanates useful in the production of powder coatings in accordance with the invention are described, for example, in the following publications: DE-OS 21 05 777, DE-OS 25 42 191, DE-OS 27 35 497, DE-OS 28 12 252, DE-OS 29 46 085, DE-OS 30 04 876, DE-OS 30 39 824 and DE-OS 34 34 881. Polyisocyanates which are free of blocking agents useful for the production of powder coatings are described, for example, in the following publications: EP-A-00 45 994, EP-A-00 45 996, EP-A-00 45 998 and EP-A-02 54 152.

The powder coatings of the present invention may contain as further components auxiliary substances and additives customary in powder coating technology. For example, catalysts for the polyurethane reaction such as tin(II) salts of $C_6$- to $C_{12}$-alkanecarboxylic acids (tin (II) hexanoate, tin (II) ethylhexanoate) and tin (IV) compounds (dibutyltin dilaurate) may be used. Leveling agents such as poly (butyl acrylate) or those based on polysilicones; light stabilizers such as sterically hindered amines; UV absorbers such as benztriazoles or benzophenones; and pigments such as titanium dioxide may also be employed.

In one procedure for the production of the ready-for-use powder coatings of the present invention, the individual components are intimately mixed and combined, for example, in an extruder or kneader at a temperature above the melting range of the individual components (e.g., at 80° to 120° C.) to form a homogeneous material. The discharged solidified solid is ground and particle fractions above the desired particle sizes (for example, above 0.1 mm) are removed by passing the ground solid through one or more sieves. In this procedure, no notable reaction between the components generally occurs.

The nature and proportions of the components used in the production of the powder coatings are generally selected so that from about 0.5 to about 1.5, preferably from about 0.8 to about 1.2 isocyanate groups (including any blocked isocyanate groups) are provided for each hydroxyl group.

The powder coatings of the present invention may be applied by conventional powder application methods (such as electrostatic powder spraying or whirl sintering) to the heat resistant substrates to be coated. The coatings can be cured by heating to temperatures of from about 120° to about 220° C., preferably from about 140° to about 200° C. Hard, glossy, solvent-resistant, chemical-resistant and sufficiently elastic coatings are then obtained. These coatings also have excellent anti-corrosion properties and good thermal stability with respect to color.

Any heat resistant substrate such as glass and metals can be coated in accordance with the present invention. The powder coatings of the present invention are particularly useful for the coating of metals, especially motor vehicle components.

Having thus described our invention, the following examples are given as being illustrative thereof. Unless otherwise indicated, the parts and percentages given in the following examples are parts by weight or percentages by weight.

EXAMPLES

I. General Procedure for the Production of the Polyhydroxy Copolymer

Part I was charged into a 10-1 stainless steel reactor with stirring, cooling and heating devices as well as electronic temperature control and heated to reaction temperature. Then, starting simultaneously, part II (addition over a total period of 2.5 hours) and part III (addition over a total period of 3 hours) were metered in at constant temperature. After addition of part III, the mixture was stirred for a further one hour at the polymerization temperature. Then volatile decomposition products possibly formed from the initiator and residual monomers possibly present were removed by distillation as a result of brief application of a vacuum of about 15 mbar at the polymerization temperature.

Subsequently, for cooling, the hot, low-viscosity product formed was discharged from the reactor into aluminum dishes. After solidification of the resin melt, it was mechanically comminuted.

On the larger production scale, the discharged, hot product was suitably cooled on cooling conveyors and then comminuted in a granulation plant.

The reaction temperatures and the compositions of parts I to III are listed together with the characteristic data of the products obtained in Table 1.

Starting Materials

Polyester P1:

A polyester polyol of OH number 143 mg KOH/g, acid number 3 mg KOH/g, produced by reaction of 4 tool 1,6-hexanediol, 1 mol trimethylolpropane, 2.5 mol isophthalic acid, 0.5 mol phthalic anhydride and 1 mol adipic acid.

Polyester P2:

A polyester polyol of OH number 109 mg KOH/g, acid number 1.9 mg KOH/g, produced by reaction of 4 mol 1,6-hexanediol, 0.75 mol trimethylolpropane, 2 mol isophthalic acid, 1 mol hexahydrophthalic anhydride and 1 mol adipic acid.

Polyisocyanate I:

The reaction product, blocked with $\epsilon$-caprolactam, of 4,4'-diisocyanatodicyclohexylmethane with 1,6-hexanediol containing 9.7% blocked isocyanate groups (calculated as NCO, molecular weight=42).

TABLE 1

Polyester/polyacrylate-polyols by the process according to the invention (quantities in g)

| | Copolymer | | | | |
|---|---|---|---|---|---|
| | I | II | III | IV | V |
| Part I | | | | | |
| Polyester P1 | 1600 | 800 | | | |
| Polyester P2 | | | 1600 | 800 | 800 |
| Dimethyl maleate | 320 | 800 | 320 | 320 | 320 |
| Part II | | | | | |
| Methyl methacrylate | 2800 | 2428 | 2800 | 3183 | 3983 |
| Styrene | 2000 | 2428 | 2000 | 2275 | 1475 |
| Hydroxyethyl methacrylate | 960 | 1224 | 960 | 1091 | 1091 |
| Acrylic acid | 80 | 80 | 80 | 91 | 91 |
| Part III | | | | | |
| Di-tert-butyl peroxide | 240 | 240 | 240 | 240 | 240 |
| Polymerization temperature (°C.) | 160 | 160 | 160 | 160 | 160 |
| Solids contant (%) | 99.1 | 99.8 | 99.3 | 99.3 | 99.2 |
| Acid number (mg KOH/g) | 9.4 | 10.3 | 5.9 | 12.0 | 11.6 |
| OH number (mg KOH/g) | 78 | 79 | 81 | 68 | 69 |
| Glass transition temperature TG (°C.) | 39 | 54 | 30 | 44 | 36 |

II. Production of the Powder Coatings According to the Invention

The copolymers I to V were each melted and homogenized with Polyisocyanate I and other auxiliary materials and additives (indicated in Table II) an ordinary commercial extruder at 100° to 110° C. After the solidification of the discharged melt, the product was ground, freed from fractions with a particle diameter above 0.1 mm by sieving, applied by means of an electrostatic spraying device to test sheets and then cured for 15 minutes at 180° C.

The solvent resistance of the lacquer films (about 50 $\mu$m thick) was tested by means of a wipe test with an acetone-soaked swab. The number reported in Table 2 is the number of double rubs after which the lacquer film remained without visible change. No more than 50 double rubs were carried out per film.

Table II lists the formulations in each case in wt. % as well as the test results determined on the lacquer films.

TABLE II

Formulations of the powder coatings according to the invention and text results of the corresponding lacquer films

| | Formulation | | | | |
|---|---|---|---|---|---|
| | 1 | 2 | 3 | 4 | 5 |
| Copolymer (wt %) | 43.1 I | 61.2 II | 60.5 III | 63.7 IV | 63.7 V |
| Polyisocyanate I (wt %) | 25.5 | 37.8 | 37.5 | 34.3 | 34.3 |
| Tin(II) octanoate (wt %) | 0.7 | | 1.0 | 1.0 | 1.0 |
| Perenol F 45[1] (wt %) | 0.7 | 1.0 | 1.0 | 1.0 | 1.0 |
| Titanium dioxide (wt %) | 30.0 | | | | |
| Test results | | | | | |
| Film thickness (μm) | 58–62 | 58–62 | 56–62 | 58–66 | 56–62 |
| Gloss (Gardner, 20°/190°) | 49/82 | 79/97 | 75/95 | 78/97 | 75/95 |
| Adhesion (cross cut)[2] | 0 | 0 | 0 | 0–1 | 0 |
| Cupping index (mm) | 8.6 | 9.0 | 9.5 | 9.0 | 9.2 |
| Acetone wipe test, number of double rubs | 50 | 50 | 50 | 50 | 50 |

[1] ordinary commercial levelling agent; manufacturer, Henkel Company Dusseldorf
[2] 0 = best value, 5 = worsts value Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a hydroxy-functional copolymer by radical-initiated copolymerization of monomers in the absence of a solvent comprising
   a) heating to a polymerization temperature of from about 130° to about 200° C. a mixture comprising
      A) from about 5 to about 30 parts by weight of at least one polyester polyol with a hydroxyl number of from about 40 to about 180 at an acid value of less than 12 and a glass transition temperature of from about −40° to about 80° C. and
      B) from about 1 to about 10 parts by weight of an olefinically unsaturated maleic acid di(cyclo)alkyl ester having from 1 to 12 carbon atoms in the (cyclo)alkyl group, and
   b) adding to the mixture from a)
      C) from about 42 to about 93,5 parts by weight of a monomer mixture of
         (1) from 0 to about 70 parts by weight of methyl methacrylate,
         (2) from 0 to about 60 parts by weight of at least one (cyclo)alkyl ester of acrylic and/or methacrylic acid having 2 to 18 carbon atoms in the (cyclo)alkyl group,
         (3) from about 10 to about 60 parts by weight of at least one vinyl aromatic,
         (4) from about 6 to about 40 parts by weight of
            (i) hydroxyalkyl esters of acrylic and/or methacrylic acid having from 2 to 6 carbon atoms in the hydroxyalkyl group and/or
            (ii) a reaction product of at least one ester of (i) with ε-caprolactone having a molecular weight of no greater than 500, and
         (5) from 0 to about 5 parts by weight of an olefinically unsaturated carboxylic acid,
         in which the sum of the parts by weight of (1), (2), (3), (4) and (5) is 100, and
      D) from about 0.5 to about 8 parts by weight of an initiator for radical polymerization at a temperature of from about 130° to about 200° C. with the sum of A), B), C) and D) being 100.

2. The process of claim 1 in which from about 5 to about 25 parts by weight of A), from about 1 to about 5 parts by weight of B), from about 64 to about 93 parts by weight of C) and from about 1 to about 6 parts by weight of D) are employed.

3. The process of claim 1 in which the monomer mixture C) is composed of
   (1) from about 15 to about 55 parts by weight of methyl methacrylate,
   (2) from 0 to about 40 parts by weight of an alkyl ester of acrylic and/or methacrylic acid having from 2 to 18 carbon atoms,
   (3) from about 10 to about 45 parts by weight of styrene,
   (4) from about 10 to about 30 parts by weight of hydroxyethyl methacrylate and/or hydroxypropyl methacrylate, and
   (5) from 0 to about 3 parts by weight of acrylic acid and/or methacrylic acid
   with the sum of the parts by weight of (1), (2), (3), (4) and (5) being 100.

4. The process of claim 3 in which the polymerization temperature in each of steps a) and b) is from about 140° to about 180° C.

5. The process of claim 4 in which the initiator D) is a peroxide-based initiator.

6. The process of claim 1 in which the polymerization temperature in each of steps a) and b) is from about 140° to about 180° C.

7. The process of claim 6 in which the initiator D) is a peroxide-based initiator.

8. The process of claim 1 in which the initiator D) is a peroxide-based initiator.

9. A process for the production of a powder coating comprising combining the hydroxy functional copolymer of claim 1 with a polyisocyanate.

* * * * *